United States Patent
Liu et al.

(10) Patent No.: US 10,948,309 B2
(45) Date of Patent: Mar. 16, 2021

(54) NAVIGATION METHOD, SHOPPING CART AND NAVIGATION SYSTEM (71) Applicant: BOE TECHNOLOGY GROUP CO., LTD., Beijing (CN)

(72) Inventors: Xiangyang Liu, Beijing (CN); Tong Liu, Beijing (CN); Zhiguo Zhang, Beijing (CN); Hui Rao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 143 days.

(21) Appl. No.: 16/214,032

(22) Filed: Dec. 7, 2018

(65) Prior Publication Data
US 2019/0323851 A1 Oct. 24, 2019

(30) Foreign Application Priority Data
Apr. 19, 2018 (CN) .......................... 201810353072.2

(51) Int. Cl.
G01C 21/36 (2006.01)
G06K 9/00 (2006.01)
G01C 21/00 (2006.01)

(52) U.S. Cl.
CPC ..... *G01C 21/3626* (2013.01); *G06K 9/00268* (2013.01); *G06K 9/00295* (2013.01)

(58) Field of Classification Search
USPC ........................................................ 701/517
See application file for complete search history.

(56) References Cited

U.S. PATENT DOCUMENTS

| | | | | |
|---|---|---|---|---|
| 2004/0143505 A1* | 7/2004 | Kovach | ................ | G06Q 20/208 705/23 |
| 2012/0123826 A1* | 5/2012 | French | ................... | G06Q 30/00 705/14.1 |
| 2013/0166193 A1* | 6/2013 | Goldman | ............. | G01C 21/206 701/410 |
| 2013/0261964 A1* | 10/2013 | Goldman | ............. | G05D 1/0259 701/500 |
| 2017/0293991 A1 | 10/2017 | High et al. | | |
| 2019/0073656 A1* | 3/2019 | Joseph | ............. | G06Q 20/40145 |

(Continued)

FOREIGN PATENT DOCUMENTS

| | | |
|---|---|---|
| CN | 106204240 A | 12/2016 |
| CN | 206265111 U | 6/2017 |
| CN | 107504975 A | 12/2017 |

(Continued)

OTHER PUBLICATIONS

First Chinese Office Action dated Dec. 16, 2019, received for corresponding Chinese Application No. 201810353072.2, 22 pages.

(Continued)

*Primary Examiner* — Tyler D Paige
(74) *Attorney, Agent, or Firm* — Kinney & Lange, P.A.

(57) ABSTRACT

The present disclosure provides a navigation method, a shopping cart and a navigation system. The navigation method includes: after a user has selected a shopping cart, associating the user with the shopping cart; acquiring a position of the shopping cart and a parking spot where a vehicle of the user is located; and generating a navigation route in accordance with the position of the shopping cart and the parking spot where the vehicle of the user is located.

13 Claims, 7 Drawing Sheets after a user has selected a shopping cart, associating the user with the shopping cart — 101 acquiring a position of the shopping cart and a parking spot where a vehicle of the user is located — 102 generating a navigation route in accordance with the position of the shopping cart and the parking spot where the vehicle of the user is located — 103

(56) References Cited

U.S. PATENT DOCUMENTS

2019/0323851 A1* 10/2019 Liu .................... G01C 21/3626
2019/0370885 A1* 12/2019 Wu .................... G06Q 30/0635

FOREIGN PATENT DOCUMENTS

| CN | 107730993 A | 2/2018 |
| CN | 107845287 A | 3/2018 |
| JP | 2012185584 A | 9/2012 |
| KR | 20170008634 A | 1/2017 |
| WO | 2016206062 A1 | 12/2016 |

OTHER PUBLICATIONS

Second Chinese Office Action dated Jul. 8, 2020, for corresponding Chinese Application No. 201810353072.2.

* cited by examiner

NAVIGATION METHOD, SHOPPING CART AND NAVIGATION SYSTEM

CROSS-REFERENCE TO RELATED APPLICATION

The present application claims a priority of Chinese patent application No. 201810353072.2 filed on Apr. 19, 2018, which is incorporated herein by reference in its entirety.

TECHNICAL FIELD

The present disclosure relates to the field of user navigation technology, in particular to a navigation method, a shopping cart and a navigation system adapted to a shopping mall or a parking lot.

BACKGROUND

Many users drive to a shopping mall. However, due to such reasons as a relatively large distance between the shopping mall and a parking lot and a complicated path in the parking lot, usually it may take a long time for the user to find a parking spot. In addition, a large shopping mall is provided with many entrances and exits, and after shopping, it is difficult for the user to return to the parking spot immediately. In this case, the user may spend a long time finding the closest entrance and then returning to the parking spot by the same way the user came, or the user may try to find the parking spot via any other routes inside or outside the shopping mall.

Further, when finding the parking spot, the user needs to push a shopping cart, resulting in a waste of physical energy.

SUMMARY

According to a first aspect, the present disclosure provides in some embodiments a navigation method, including: associating a user with a shopping cart; after the user has paid the bill, acquiring a position of the shopping cart and a parking spot where a vehicle of the user is located; and generating a navigation route in accordance with the position of the shopping mark and the parking spot where the vehicle of the user is located.

In a possible embodiment of the present disclosure, prior to associating the user with the shopping cart, the navigation method further includes: determining the parking spot where the vehicle of the user is located; identifying identification information about the user; and associating the user with the parking spot where the vehicle of the user is located.

In a possible embodiment of the present disclosure, determining the parking spot where the vehicle of the user is located includes: acquiring an image of a selected region, the selected region including at least one parking spots; identifying the user in the image; and acquiring a distance between the user and each parking spot in the selected region, and determining a parking spot closest to the user as the parking spot where the vehicle of the user is located.

In a possible embodiment of the present disclosure, identifying the identification information about the user includes: acquiring a facial image of the user; extracting a facial feature of the user through a selected image identification model; comparing the extracted facial feature with facial feature templates in a feature database, so as to acquire a matching level between the facial feature and each facial feature template; and determining whether the matching level between each facial feature template and the extracted facial feature is greater than or equal to a matching threshold, when the matching level is greater than or equal to the threshold, determining identification information about the facial feature template corresponding to the matching level as the identification information about the user, and when the matching level is smaller than the threshold, storing the extracted facial feature.

In a possible embodiment of the present disclosure, the selected image identification model comprises a VGG16 neural network model.

In a possible embodiment of the present disclosure, associating the user with the shopping cart includes: identifying the identification information about the user; acquiring an identification code of the shopping cart; and associating the user with the shopping cart in accordance with the identification information about the user and the identification code.

In a possible embodiment of the present disclosure, associating the user with the shopping cart includes: acquiring an account inputted by the user; determining the identification information about the user in accordance with the account; acquiring the identification code of the shopping cart; and associating the user with the shopping cart in accordance with the identification information about the user and the identification code.

In a possible embodiment of the present disclosure, prior to acquiring the position of the shopping cart and the parking spot where the vehicle of the user is located, the navigation method further includes monitoring whether checkout information about the user has been received.

According to a second aspect, the present disclosure provides in some embodiments a shopping cart, including a shopping cart body, a communication module and a positioning module. The positioning module and the communication module are arranged on the shopping cart body, and the positioning module is coupled to the communication module. The positioning module is configured to acquire data associated with a position of the shopping cart and transmit the data to the communication module. The communication module is configured to upload the data to a server and receive a navigation route from the server.

In a possible embodiment of the present disclosure, the shopping cart further includes a camera module disposed on the shopping cart body, connected to the communication module, and configured to acquire a user image and transmit the user image to the communication module. The communication module is further configured to upload the user image to the server.

In a possible embodiment of the present disclosure, the positioning module includes a Bluetooth module which is disposed on the shopping cart body and connected to the communication module. The Bluetooth module is configured for communicating with other Bluetooth modules in a shopping mall where the shopping cart is located so as to acquire communication data. The communication module is further configured to forward the communication data to the server, and the server is configured to determine a position of the shopping cart in accordance with the communication data.

In a possible embodiment of the present disclosure, the shopping cart further includes a display module disposed on the shopping cart body, connected to the communication module, and configured to display the navigation route received from the communication module.

According to a third aspect, the present disclosure provides in some embodiments a navigation system, including a server, a plurality of camera modules disposed in a parking lot, and the shopping cart according to any one of the embodiments of the second aspect of the present disclosure.

In a possible embodiment of the present disclosure, the navigation system further includes a plurality of Bluetooth modules disposed in a shopping mall.

BRIEF DESCRIPTION OF THE DRAWINGS

The following drawings are provided to facilitate the understanding of the present disclosure, and constitute a portion of the description.

DETAILED DESCRIPTION OF THE EMBODIMENTS

The present disclosure will be described hereinafter in conjunction with the drawings and embodiments. Unless otherwise defined, same or similar reference numbers in the drawings represent an identical or similar element. The following embodiments are for illustrative purposes only, but shall not be used to limit the scope of the present disclosure.

Users typically drive to a shopping mall. However, due to such reasons as a relatively large distance between the shopping mall and a parking lot and a complicated path in the parking lot, usually it may take a long time for the user to find a parking spot. In addition, a large shopping mall is provided with many entrances and exits, and after shopping, it is difficult for the user to return to the parking spot immediately. In this case, the user may spend a long time finding the entrance and then returning to the parking spot by the same way the user came, or the user may try to find the parking spot via any other routes inside or outside the shopping mall. In addition, while finding the parking spot, the user needs to push a shopping cart, resulting in a waste of physical energy.

An object of the present disclosure is to provide a navigation method so as to solve the above-mentioned problems at least in part. In the navigation method, a server may determine a parking spot where a vehicle of a user is located in accordance with images of the parking spots acquired by a plurality of camera modules, and associate the user with the parking spot. After the user enters a shopping mall and selects a shopping cart, the service may associate the user with the shopping cart. During shopping or after checkout, the server may position the shopping cart, and generate a navigation route in accordance with a position of the shopping cart and the parking spot where the vehicle is located. As a result, it is possible for the user to directly find the parking spot and the vehicle in accordance with the navigation route, thereby to save time and improve user experience.

Figure 1:
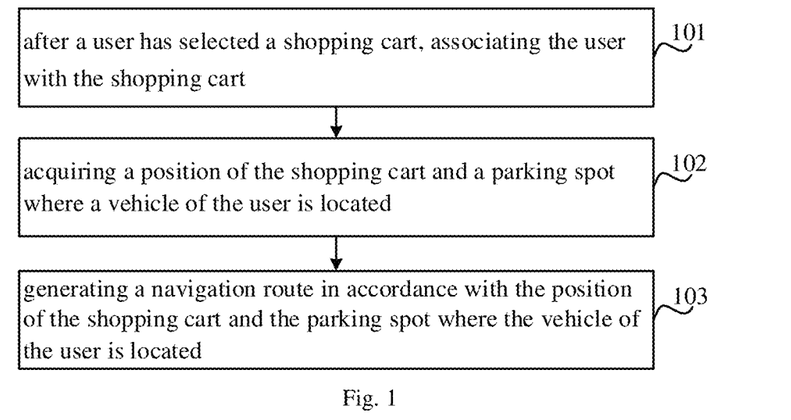
FIG. 1 is a flow chart of a navigation method according to one embodiment of the present disclosure.

FIG. 1 is a flow chart of a navigation method according to one embodiment of the present disclosure. As shown in FIG. 1, the navigation method comprises the following steps.

Step 101: after a user has selected a shopping cart, associating the user with the shopping cart.

Usually, the user may select the shopping cart after entering a shopping mall. In a possible embodiment of the present disclosure, the user may be associated with the shopping cart in response to selection of the shopping cart.

Figure 2:
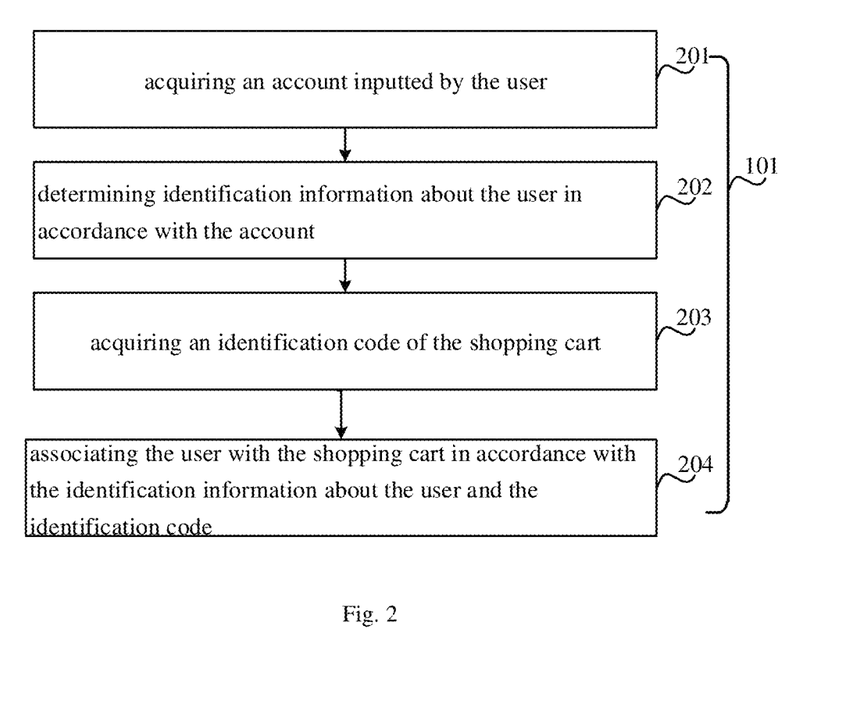
FIG. 2 is another flow chart of the navigation method according to one embodiment of the present disclosure.

In some embodiments, the user logs into a navigation system for performing the navigation method to implement the association. As shown in FIG. 2, the shopping cart is provided with a display module, and the user may log into the navigation system using an account and a password through a keyboard or screen touching. After the login, a server acquires account information about the user (corresponding to Step 201), determine identification information about the user in accordance with the account information (corresponding to Step 202), acquire an identification code of the shopping cart (corresponding to Step 203), and associate the identification information about the user with the identification code of the shopping cart, or store the identification code of the shopping cart into association information corresponding to the account (corresponding to Step 204). By using the account of the user, it is possible to associate the user with the shopping cart in a rapid and simple manner.

It should be appreciated that, an order of Steps 201 and 202 may depend on a specific scenario. For example, Step 201 may be performed prior to Step 202, subsequent to Step 202, or simultaneously, which will not be particularly defined herein.

Figure 3:
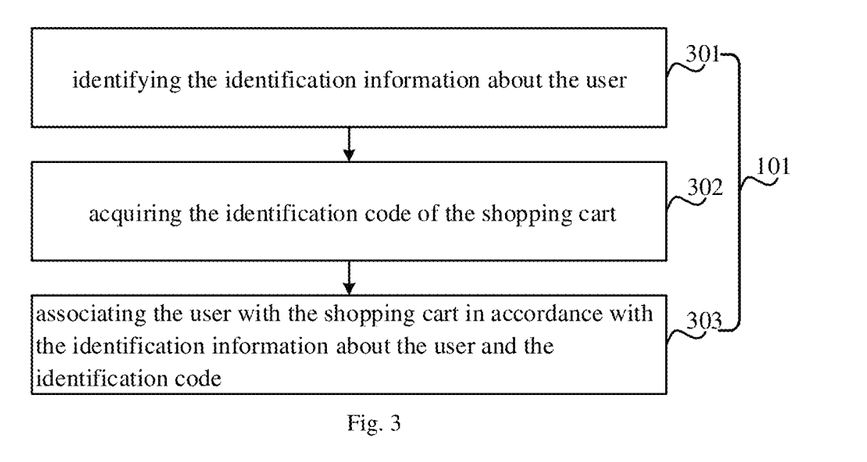
FIG. 3 is a schematic view showing the association of a user with a shopping cart according to one embodiment of the present disclosure.

In some embodiments, the association is performed without requiring the user to log into the navigation system. As shown in FIG. 3, the server may identify the identification information about the user in accordance with the acquired data (corresponding to Step 301, the acquired data may be a user image), acquire the identification code of the shopping cart (corresponding to Step 302), and finally associate the user with the shopping cart in accordance with the identification information about the user and the identification code of the shopping cart (corresponding to Step 303), which will be described hereinafter.

For example, the server may extract a facial feature of the user from the image through an image identification model, and take the extracted facial feature as the identification information about the user, or generate a temporary identification code in accordance with the extracted facial feature as the identification information about the user.

It should be appreciated that, an order of Steps 301 and 302 may depend on a specific scenario. For example, Step

301 may be performed prior to Step 302, subsequent to Step 302, or simultaneously, which will not be particularly defined herein.

The server extracts a facial feature of the user from the image through an image identification model, and takes the extracted facial feature as the identification information about the user, or generates a temporary identification code in accordance with the extracted facial feature as the identification information about the user.

Step 102: acquiring a position of the shopping cart and a parking spot where a vehicle of the user is located.

In a possible embodiment of the present disclosure, the server may acquire the position of the shopping cart and a position of the parking spot where the vehicle of the user is located in accordance with the association information, which will be described hereinafter in more detail.

In some embodiments, the position of the shopping cart is a real-time position.

In some embodiments, the position of the shopping cart is acquired in a non-real-time manner, for example the shopping cart may be configured to generate position information with a fixed time interval (e.g. generating position information every 5 seconds). When the position of the shopping cart is required, the position information generated at the latest time can be acquired.

Step 103: generating a navigation route in accordance with the position of the shopping cart and the position of the parking spot.

In a possible embodiment of the present disclosure, the server may generate the navigation route in accordance with the position of the shopping cart and the position of the parking spot using a predetermined navigation route algorithm. The navigation route algorithm may be any algorithm known in the art, and thus will not be particularly defined herein.

According to the navigation method in the embodiments of the present disclosure, the navigation route may be generated in accordance with the position of the shopping cart and the position of the parking spot associated with the same user, so as to facilitate the user to find the parking spot rapidly, save time, and improve user experience. In addition, it is able to reduce a waste of physical energy for the user.

Figure 4:
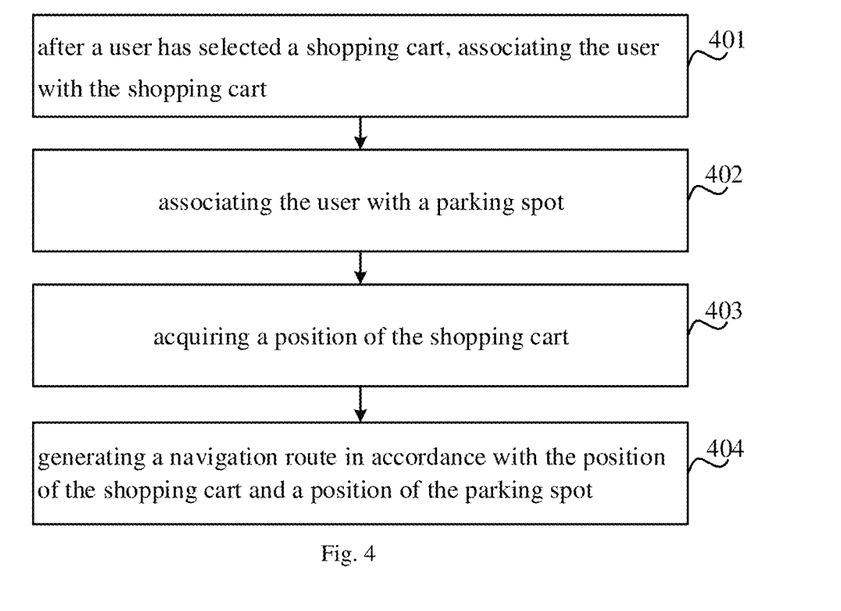
FIG. 4 is yet another flow chart of the navigation method according to one embodiment of the present disclosure.

FIG. 4 is a flow chart of the navigation method according to some embodiments of the present disclosure. As shown in FIG. 4, the navigation method may include the following steps.

Step 401: after a user has selected a shopping cart, associating the user with the shopping cart.

A process and a principle of Step 401 may be the same as those of Step 101, and thus will not be particularly defined herein.

Step 402: associating the user with a parking spot where a vehicle of the user is located.

After the user has parked the vehicle at the parking spot, a server may determine identification information about the user, the vehicle of the user, and the parking spot where the vehicle of the user is located, and then associate the identification information about the user with the parking spot or store a position of the parking spot into association information about the identification information.

In a possible embodiment of the present disclosure, the user may log into a navigation system using an account and a password through a display module on the shopping cart, and then input a serial number of the parking spot. The server may acquire the identification information corresponding to the account, acquire the position of the parking spot in accordance with the serial number of the parking spot, and store the position of the parking spot into the association information.

In a possible embodiment of the present disclosure, a parking lot is provided with a plurality of camera modules, each of which is configured to acquire an image of a selected region. The selected region of each camera module includes at least one parking spot.

When the user is parking the vehicle, the camera module may collect an image of the vehicle, an image of the user in the vehicle, and an image of the user who has gotten out of the vehicle. The server may determine the identification information about the user, the vehicle of the user and the parking spot where the vehicle is located in accordance with the above images, and then store information about the parking spot as association information about the identification information.

It should be appreciated that, the identification information about the user may be information submitted by the user during the registration, a biological feature (e.g. a facial feature or features of body joints) of the user extracted by the server from the image using an image identification algorithm, or a temporary identification code generated by the server in accordance with the biological feature of the user. However, the identification information about the user is not limited to those mentioned above.

Figure 5:
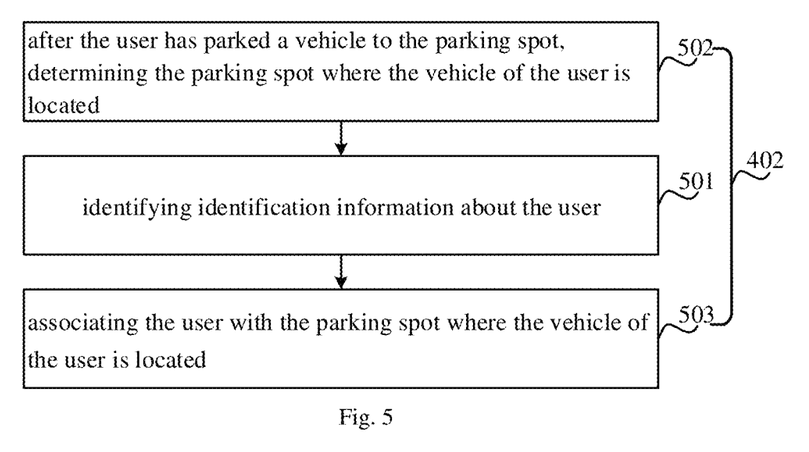
FIG. 5 is a schematic view showing the association of the user with a parking spot according to one embodiment of the present disclosure.

In some embodiments, as shown in FIG. 5, the server may identify a facial region of the user from the image using an Adaboost algorithm, and determine a facial image of the user through a rectangular box. Then, the server may extract the facial feature from the facial image in accordance with a selected image identification model, and compare the extracted facial feature with facial feature templates in a feature database, so as to acquire a matching level between the extracted facial feature and each facial feature template in the feature database. The facial feature templates in the feature database may be acquired in accordance with images uploaded by users during the registration. When the matching level is greater than or equal to a threshold, the server may determine identification information about the facial feature corresponding to the matching level as the identification information about the user (corresponding to Step 501). When the matching level is smaller than the threshold, the server may store the facial feature as the identification information about the user, or generate a temporary identification code in accordance with the facial feature as the identification information about the user.

In a possible embodiment of the present disclosure, after comparing the extracted facial feature with each facial feature template in the feature database and acquiring the matching levels, the server may determine identification information about the facial feature template having the highest matching level as the identification information about the user.

Further referring to FIG. 5, the server may calculate a distance between the facial region of the user and each vehicle in the image, and determine a vehicle closest to the user as the vehicle of the user. The server may calculate the distance between the facial region and the vehicle on the basis of a center of the facial region, so as to improve the calculation accuracy.

In some embodiments, an image acquired before the user has left the parking spot may be selected so as to determine the vehicle which belongs to the user, thereby to improve the association accuracy. After the determination of the vehicle of the user, the server may store the parking spot where the vehicle is located (a serial number or a position of the parking spot) into the association information about the user (corresponding to Steps 502 and 503). The order of Steps 501 and 502 is not particularly limited herein.

In the present embodiment, an order of Steps 401 and 402 is not particularly limited. For example, Step 401 may be performed prior to Step 402, subsequent to Step 402, or simultaneously, which is not particularly limited herein.

Step 403: acquiring a position of the shopping cart and the parking spot where the vehicle of the user is located.

The position of the shopping cart may be acquired in real time or at intervals during the movement of the shopping cart, or the position of the shopping cart may be acquired after checkout.

In some embodiments of the present disclosure, a positioning module on the shopping cart may include a Global Positioning System (GPS) device. The position of the shopping cart may be acquired through the GPS device and then the position is transmitted to the server by the shopping cart.

In some embodiments, the positioning module on the shopping cart may include a Bluetooth module, and a plurality of Bluetooth modules may be arranged at predetermined positions in the shopping mall so that, at any position in the shopping mall, the Bluetooth module on the shopping cart is capable of communicating with any adjacent Bluetooth module in the shopping mall. The Bluetooth module on the shopping cart may upload communication data to the server through a communication module on the shopping cart, and then the server may determine the position of the shopping cart in accordance with the communication data. In this way, it is possible to solve the problem that a signal from the GPS device has relatively poor quality when the shopping mall is located underground. A method for determining a position of one Bluetooth module in accordance with the communication data among the plurality of Bluetooth modules is known in the art, and thus will not be particularly defined herein.

In some embodiments, the positioning module may include camera modules disposed at a region between the entrance of the shopping mall and the parking lot, so as to acquire the user image in real time. The server may track the user in accordance with the image, and determine a position of the user. Of course, an initial position of the user may be transmitted to the server through a communication module at a counter. An image positioning method is known in the art, and thus will not be particularly defined herein.

Also, the position of the shopping cart may be acquired through other approaches, e.g. by using Wi-Fi, Zigbee, visible light communication, etc. Necessary hardware devices may be mounted on the shopping cart so as to perform a corresponding positioning method.

In the present embodiment, the server may acquire the parking spot where the vehicle of the user is located. When a number of the parking spot is included in the association information about the user, the user may inquire the position of the parking spot in accordance with a pre-stored correspondence between the serial numbers and the positions. Alternatively, the server may directly read the position of the parking spot from the association information.

In some embodiments of the present disclosure, prior to acquiring the position of the shopping cart and the parking spot, the server may further monitor whether checkout information about the user has been received. For example, when the shopping cart is moved close to the counter, the communication module on the shopping cart may communicate with the communication module at the counter, and after checkout is finished, the communication module on the shopping cart may receive the checkout information from the communication module at the counter, and transmit the checkout information to the server. If no checkout information is received, the server will keep monitoring until the checkout information has been received. Upon receipt of the checkout information, the server may acquire the position of the shopping cart and the parking spot where the vehicle of the user is located.

Step 404: generating a navigation route in accordance with the position of the shopping cart and the position of the parking spot.

A process and a principle of Step 404 may be the same as those of Step 103, and thus will not be particularly defined herein.

In the embodiments of the present disclosure, the identification information about the user may be determined through image identification, so as to improve accuracy of the identification. In addition, the vehicle closest to the user will be determined as the vehicle belonging to the user, and then the parking spot where the vehicle is located will be associated with the user. As a result, it is possible to automatically associate the user with the parking spot when the user is parking the vehicle (or before the user getting off the vehicle and left the parking spot),without a need for user participation, thereby to save time.

It should be appreciated that the features in the navigation method in FIGS. 1-5 may be combined in any form depending on a specific scenario, as long as these features do not conflict, so as to acquire different solutions which also fall within the scope of the present disclosure.

Figure 6:
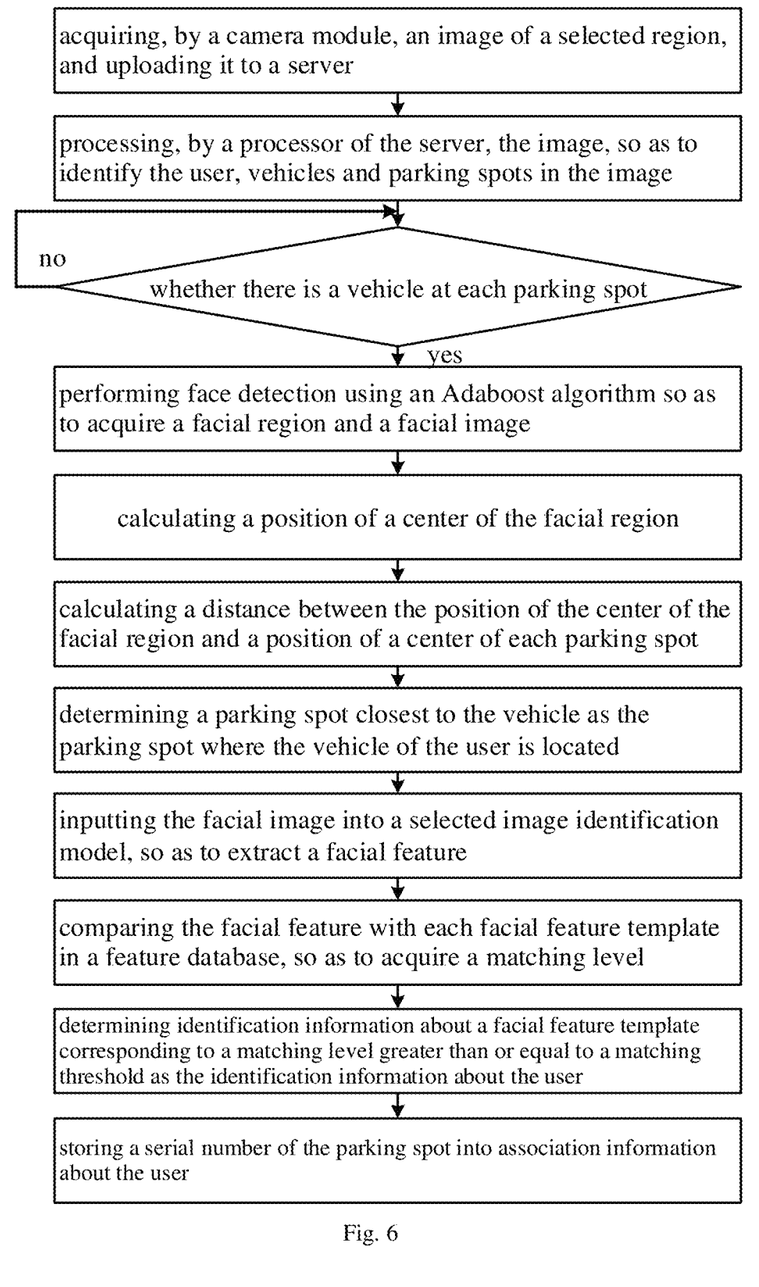
FIG. 6 is a schematic view showing the association of the user with the parking spot in a specific application scenario according to one embodiment of the present disclosure.
Figure 7:
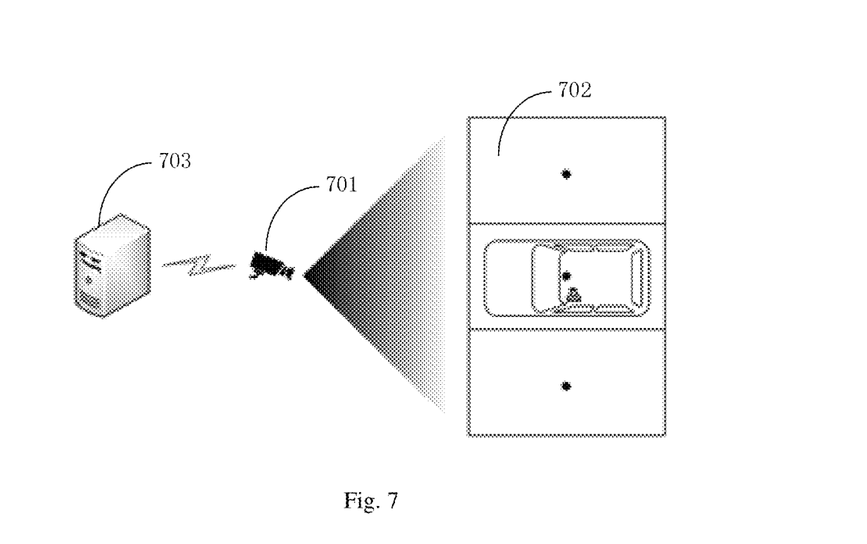
FIG. 7 is a schematic view showing a selected region of a camera module in a specific application scenario according to one embodiment of the present disclosure.

FIGS. 6-9 show the specific procedures of the navigation method. As shown in FIG. 6, each camera module at the parking lot may acquire an image of the selected region and upload it to the server. The plurality of camera modules may be numbered, and a correspondence between a serial number and a position of each camera module may be determined and stored in the server. Each camera module may acquire the parking spots in the selected region. As shown in FIG. 7, each camera module 701 may acquire an image of a region including three parking spots 702, and then upload the image to the server 701.

Further referring to FIG. 6, the server may process the image, and identify the user, the vehicles and the parking spots in the image. Firstly, the server may determine whether there is a vehicle at each parking spot in the image, and when there is no vehicle, acquire and process a next image. When there is a vehicle at the parking spot, the server may perform face detection using the Adaboost algorithm, so as to acquire the facial region and the facial image. Then, the server may calculate a position of a center of the facial region, calculate a distance between the center and each of the three parking spots in the image, and take a parking spot closest to the user as the parking spot where the vehicle of the user is located. In a possible embodiment of the present disclosure, the server may calculate a distance between the position of the center of the facial region and a position of a center of each parking spot. The server may input the facial image into the selected image identification model, extract the facial feature, and compare the facial feature with each facial feature template in the feature database so as to acquire a matching level therebetween. Then, the server may determine identification information about the facial feature template corresponding to a matching level greater than or equal to a matching threshold as the identification information about the user, and store a serial number of the parking spot into the association information about the user.

Figure 8:
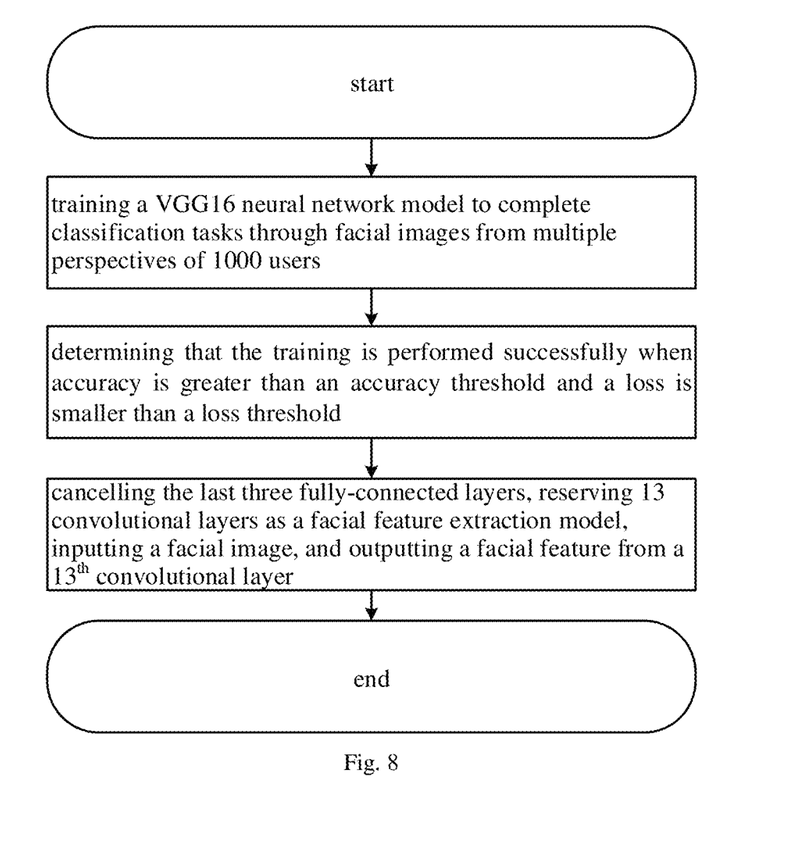
FIG. 8 is a schematic view showing the training of an image identification model in a specific application scenario according to one embodiment of the present disclosure.

It should be appreciated that the image identification module may be pre-trained and stored in the server. As shown in FIG. 8, when the user has registered in the navigation system, facial images from multiple perspectives may be acquired. A training set may be generated in accordance with the facial images from multiple perspectives of 1000 or more users and users' IDs (accounts or identification information), i.e., the users' IDs may be taken as sample tags, so as to train a VGG16 deep neural network model. The VGG16 deep neural network model is capable of completing 1000 classification tasks. After the training, the last three fully-connected layers may be canceled, and a facial feature outputted from a $13^{th}$ convolutional layer may be extracted and stored under a directory of the user in the feature database. During new user registration, the facial images from multiple perspectives of a new user maybe collected, and a facial feature may be extracted through the VGG16 deep neural network model and then stored in the feature database as the facial feature template.

Figure 9:
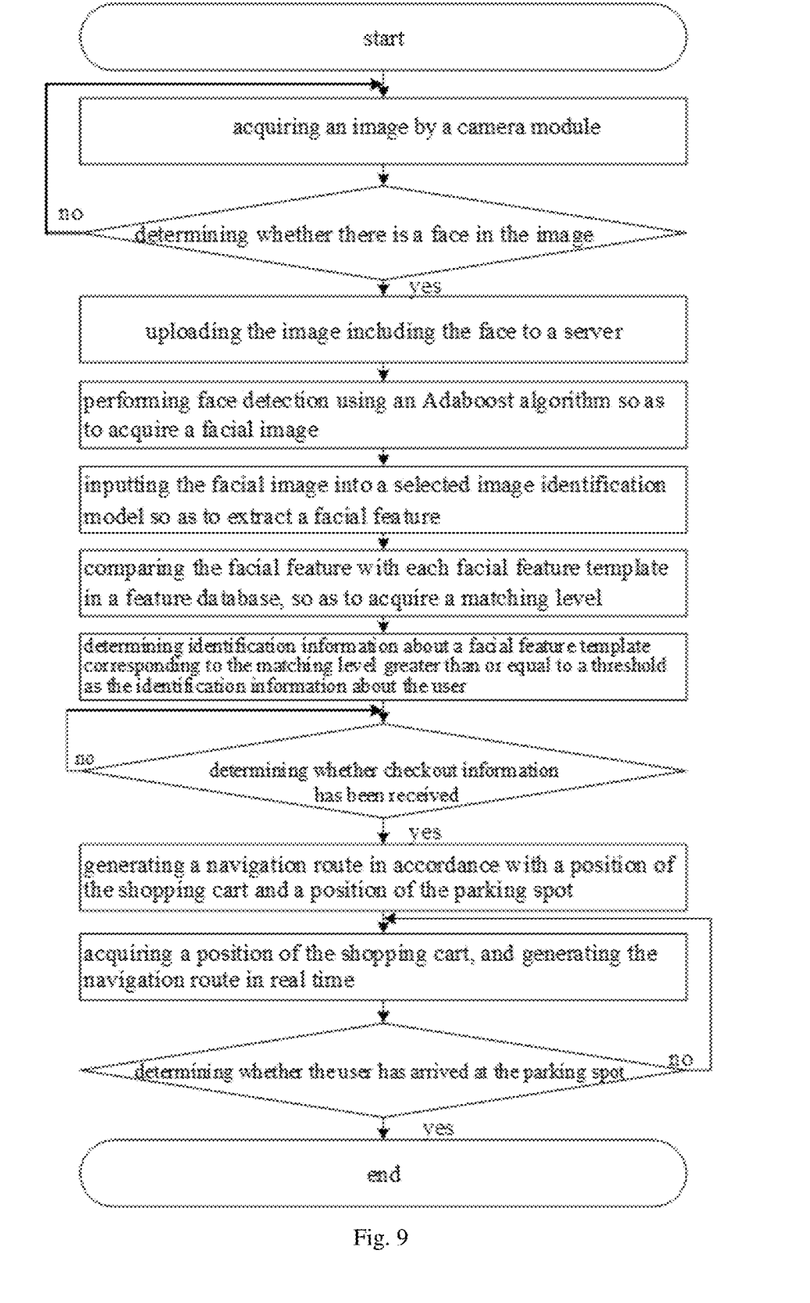
FIG. 9 is a schematic view showing the association of the user and the shopping cart and the generation of a navigation route in a specific application scenario according to one embodiment of the present disclosure.

As shown in FIG. 9, after the user has selected the shopping cart, the camera module on the shopping cart may acquire an image, and determine whether there is a facial feature in the image. When there is no facial feature, the camera module may continue to acquire the image. When there is the facial feature, the camera module may upload the image including the facial feature to the server. In a possible embodiment of the present disclosure, the server may perform the face detection using the Adaboost algorithm, so as to acquire a facial image. Then, the server may input the facial image into the selected image identification model, extract the facial feature, compare the extracted facial feature with each facial feature template in the feature database so as to determine a matching level therebetween, and determine identification information about the facial feature template having the matching level greater than or equal to the threshold as the identification information about the user. In another possible embodiment of the present disclosure, the server may determine identification information about the facial feature template having the highest matching level as the identification information about the user.

The server may monitor whether the user has paid the bill, and when the user has not paid the bill yet, continue to monitor. When the user has paid the bill, the server may determine the position of the shopping cart in accordance with the communication data from the Bluetooth module on the shopping cart, acquire the position of the parking spot where the vehicle of the user is located, generate the navigation route in accordance with the position of the shopping cart and the position of the parking spot, and transmit the navigation route to the shopping cart. Then, the navigation route may be presented to the user through the display module on the shopping cart.

When the user moves toward the parking spot, the server may continue to determine the position of the shopping cart, and update in real time the navigation route. The server may determine whether the user has arrived at the parking spot. When the user has not arrived at the parking spot yet, the server may continue to determine the position of the shopping cart. When the user has arrived at the parking spot, the entire navigation may be ended.

According to the embodiments of the present disclosure, the navigation route may be generated in accordance with the position of the shopping cart associated with the same user and the position of the parking spot associated with the same user, so as to facilitate the user to find the parking spot rapidly, save time, and improve user experience. In addition, it is able to reduce the waste of physical energy for the user.

Figure 10:
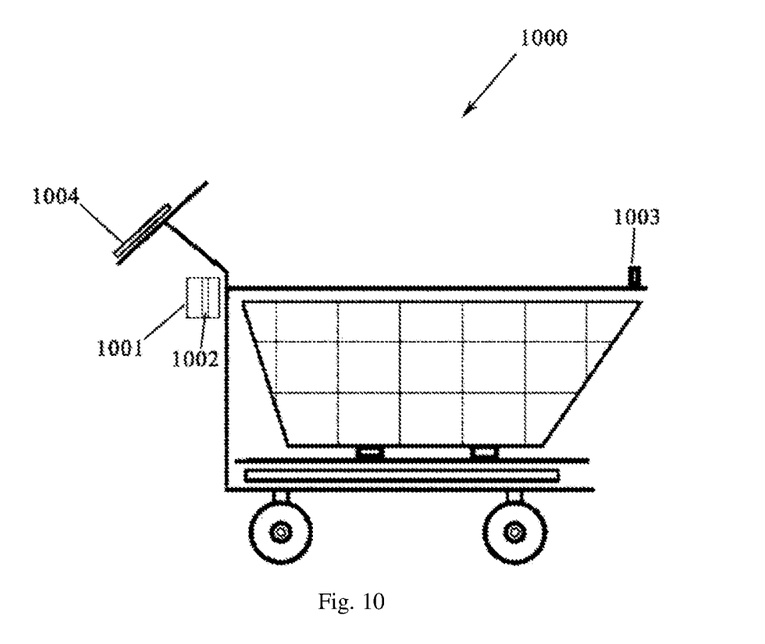
FIG. 10 is a block diagram of a shopping cart according to one embodiment of the present disclosure.

The present disclosure further provides in some embodiments a shopping cart 1000 which, as shown in FIG. 10, includes a shopping cart body, a communication module 1001 and a positioning module 1002. The positioning module 1002 and the communication module 1 are disposed on the shopping cart body, and the positioning module 1002 is coupled to the communication module 1001.

The positioning module 1002 and the communication module 1001 may be integrated in one component or be separated components.

The positioning module 1002 is configured to acquire data associated with a position of the shopping cart 1000, and transmit the data to the communication module 1001.

The communication module 1001 is configured to upload the above-mentioned data to a server (not shown), and receive a navigation route from the server.

In the above embodiments, the communication module 1001 may comprises wireless communication network modules including wide-area wireless communication network module in support of GPRS, EDGE, CDMA 1X, EVDO, WCDMA, TD LTE, FDD LTE, WiMAX, PHS, etc., or local-area wireless communication network module in support of Bluetooth, Zigbee or Wi-Fi, etc.

In some embodiments, the communication module 1001 may be further connected to a smart terminal of a user, and transmit the received navigation route to the smart terminal. The smart terminal is configured to display the navigation route. Of course, the communication module 1001 may be further configured to upload a position of the smart terminal, as a position of the shopping cart, to the server.

Further referring to FIG. 10, in some embodiments of the present disclosure, the shopping cart 1000 further includes a camera module 1003 disposed on the shopping cart body, coupled to the communication module 1001, and configured to acquire a user image and transmit the user image to the communication module 1001. The communication module 1001 is further configured to upload the user image to the server.

In some embodiments of the present disclosure, the positioning module 1002 may include a Bluetooth module, a GPS device, an inertial positioning device (gyroscope), a Radio Frequency Identity (RFID) positioning device (RFID tags), and an image tracking device including a plurality of camera modules. Any appropriate solution shall also fall within the scope of the present disclosure as long as it is able to position the shopping cart 1000.

In a possible embodiment of the present disclosure, the positioning module 1002 includes a Bluetooth module disposed on the shopping cart body and connected to the communication module 1001. The Bluetooth module is capable of communicating with Bluetooth modules in a shopping mall, so as to acquire communication data. The communication data may be forwarded to the server through the communication module, and the server may determine the position of the shopping cart in accordance with the communication data.

Referring to FIG. 10 again, in some embodiments of the present disclosure, the shopping cart 100 further includes a display module 1004 fixed on the shopping cart body, connected to the communication module 1001, and configured to display the navigation route received by the communication module.

The present disclosure further provides in some embodiments a navigation system, including a server capable of implementing the navigation method as shown in FIGS. 1-9, a plurality of camera modules disposed at a parking lot, and the shopping cart as shown in FIG. 10.

In a possible embodiment of the present disclosure, when the positioning module on the shopping cart is a Bluetooth module, the navigation system may further include a plurality of camera modules disposed within a shopping mall and capable of communicating with the Bluetooth module on the shopping cart. It should be appreciated that an operating principle of each component in the navigation system has been described hereinabove in the embodiments with reference to FIGS. 1-10, and will not be described in detail herein.

It should be appreciated that the navigation method may be performed through a computer including a processor and a memory, so as to implement the navigation system by performing the navigation method of the present disclosure.

For example, the processor may be one or more logic elements having data processing capability and/or program execution capability, e.g., Central Processing Unit (CPU), Field Programmable Gate Array (FPGA), Microprogrammed Control Unit (MCU) or Application-Specific Integrated Circuit (ASIC). The processor may be configured to execute computer instructions stored in the memory, so as to implement one or more steps of the navigation method.

The memory may be a volatile memory and/or a nonvolatile memory. The volatile memory may be a Random Access Memory (RAM) and/or a cache. The nonvolatile memory may be a Read-Only Memory (ROM), a hard disk or a flash memory.

It should be appreciated that, such words as "first" and "second" are merely used to differentiate different components rather than to represent any order, number or importance. Unless otherwise defined, such a phrase as "a plurality of" refers to that there exist two or more elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A navigation system for navigating a shopping cart, comprising a server, a plurality of camera modules located in a parking lot, and the shopping cart, wherein the shopping cart comprises a shopping cart body, a communication module and a positioning module, and wherein:
   the positioning module and the communication module are disposed on the shopping cart body, and the positioning module is coupled to the communication module;
   the positioning module is configured to acquire data associated with a position of the shopping cart and transmit the data to the communication module; and
   the communication module is configured to upload the data to a server and receive a navigation route from the server.

2. The navigation system according to claim 1, wherein the shopping cart further comprises a camera module which is disposed on the shopping cart body, coupled to the communication module, and configured to acquire a user image and transmit the user image to the communication module, wherein the communication module is further configured to upload the user image to the server.

3. The navigation system according to claim 1, wherein the positioning module comprises a Bluetooth module which is disposed on the shopping cart body and coupled to the communication module, wherein the Bluetooth module is configured for communicating with the other Bluetooth modules in a shopping mall where the shopping cart is located so as to acquire communication data, and the communication module is further configured to forward the communication data to the server, and the server is configured to determine a position of the shopping cart in accordance with the communication data.

4. The navigation system according to claim 1, wherein the shopping cart further comprises a display module which is disposed on the shopping cart body and coupled to the communication module, wherein the display module is configured to display the navigation route received from the communication module.

5. The navigation system according to claim 1, further comprising a plurality of Bluetooth modules located in a shopping mall.

6. A navigation method for navigating a shopping cart, using the navigation system according to claim 1, comprising:
   after a user has selected the shopping cart, associating the user with the shopping cart;
   acquiring a position of the shopping cart and a parking spot where a vehicle of the user is located; and
   generating a navigation route in accordance with the position of the shopping mark and the parking spot where the vehicle of the user is located.

7. The navigation method according to claim 6, wherein prior to associating the user with the shopping cart, the navigation method further comprises:
   determining the parking spot where the vehicle of the user is located;
   identifying identification information about the user; and
   associating the user with the parking spot where the vehicle of the user is located.

8. The navigation method according to claim 7, wherein determining the parking spot where the vehicle of the user is located comprises: acquiring an image of a selected region, the selected region comprising at least one parking spots; identifying the user in the image; and
   acquiring a distance between the user and each parking spot in the selected region, and determining a parking spot closest to the user as the parking spot where the vehicle of the user is located.

9. The navigation method according to claim 7, wherein identifying the identification information about the user comprises:
   acquiring a facial image of the user;
   extracting a facial feature of the user using a selected image identification model;
   comparing the extracted facial feature with facial feature templates in a feature database, so as to acquire a matching level between the facial feature and each facial feature template; and
   determining whether the matching level between each facial feature template and the extracted facial feature is greater than or equal to a matching threshold, including:
      determining the identification information about the facial feature template corresponding to the matching level as the identification information about the user in response to the matching level being greater than or equal to the threshold, and
      storing the extracted facial feature in response to the matching level being smaller than the threshold.

10. The navigation method according to claim 9, wherein the selected image identification model comprises a VGG16 neural network model.

11. The navigation method according to claim 6, wherein associating the user with the shopping cart comprises:
   identifying the identification information about the user;

acquiring an identification code of the shopping cart; and
associating the user with the shopping cart in accordance with the identification information about the user and the identification code.

12. The navigation method according to claim 6, wherein associating the user with the shopping cart comprises:
acquiring an account inputted by the user;
determining the identification information about the user in accordance with the account;
acquiring the identification code of the shopping cart; and
associating the user with the shopping cart in accordance with the identification information about the user and the identification code.

13. The navigation method according to claim 6, wherein prior to acquiring the position of the shopping cart and the parking spot where the vehicle of the user is located, the navigation method further comprises:
monitoring whether checkout information about the user has been received.

* * * * *